United States Patent
Park et al.

(10) Patent No.: US 8,755,477 B1
(45) Date of Patent: Jun. 17, 2014

(54) METHOD AND SYSTEMS OF SELECTING A MODE OF OPERATION OF A MULTI-ANTENNA RECEIVER IN A RADIO ACCESS NETWORK

(75) Inventors: Sungki Park, Ashburn, VA (US); Saied Kazeminejad, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 27 days.

(21) Appl. No.: 13/553,277

(22) Filed: Jul. 19, 2012

(51) Int. Cl.
*H04B 7/10* (2006.01)

(52) U.S. Cl.
USPC ........... 375/347; 375/260; 375/295; 375/316; 375/340; 375/346

(58) Field of Classification Search
CPC ............. H04B 7/0857; H04W 72/082; H04W 52/244; H04W 16/28; H04W 72/04; H04W 72/0406; H04W 72/042; H04W 88/06; H04L 5/0023; H04L 25/0204; H04L 25/0232; H04L 1/00; H04L 25/03; H04J 11/0023
See application file for complete search history.

(56) References Cited

U.S. PATENT DOCUMENTS

| | | | | |
|---|---|---|---|---|
| 5,852,630 | A | * | 12/1998 | Langberg et al. ............. 375/219 |
| 6,128,355 | A | * | 10/2000 | Backman et al. ............. 375/347 |
| 2005/0101279 | A1 | * | 5/2005 | Lee et al. ................... 455/278.1 |
| 2009/0154620 | A1 | * | 6/2009 | Mostafa ........................ 375/346 |
| 2011/0269459 | A1 | * | 11/2011 | Koo et al. ...................... 455/434 |
| 2012/0108194 | A1 | * | 5/2012 | Lindqvist et al. ............. 455/296 |
| 2012/0115520 | A1 | * | 5/2012 | Rossel et al. .................. 455/501 |
| 2013/0089040 | A1 | * | 4/2013 | Tabet et al. ................... 370/329 |
| 2013/0172003 | A1 | * | 7/2013 | Chun et al. ................. 455/452.1 |

* cited by examiner

*Primary Examiner* — Hirdepal Singh

(57) ABSTRACT

A radio access network (RAN) may receive signals with a plurality of antennas. Each antenna may receive a respective incoming signal. Based on the received signals, the RAN may determine an interference factor that relates to interference across the various respective incoming signals received by each antenna. The RAN may also use various criteria and formulas to calculate the interference factor. Once the RAN determines the interference factor, the RAN may determine to operate the receiver in one of two modes. The RAN may operate either in a Maximal Ratio Combining mode or in an Interference Rejection Combining mode. The RAN may periodically re-determine the interference factor and responsively re-determine the operation mode.

18 Claims, 4 Drawing Sheets

METHOD AND SYSTEMS OF SELECTING A MODE OF OPERATION OF A MULTI-ANTENNA RECEIVER IN A RADIO ACCESS NETWORK

BACKGROUND

A radio access network (RAN) typically includes base transceiver stations (BTSs), each of which may include one or more antennas. In each coverage area, a BTS may receive a signal from each antenna. Additionally, the RAN may operate in a variety of multiple-antennas modes, such as a multiple-input and multiple-output (MIMO) mode, a multiple-input and single-output (MISO) mode, or a single-input and multiple-output (SIMO) mode. Further, the RAN may also use various modulation schemes. In one example, the RAN may use orthogonal frequency-division multiplexing (OFDM) to transmit on multiple subcarriers within a single radio channel. The OFDM modulation scheme is used in wireless communication systems such as IEEE 802.11 (WiFi) systems, IEEE 802.16 (WiMAX) systems, and systems that use the Long Term Evolution (LTE) specifications of the 3rd Generation Partnership Project (3GPP).

In the MIMO, MISO, and SIMO modes, at least one wireless link (sending and/or receiving) of the RAN involves multiple antennas of the BTS in communication with one wireless communication device (WCD). When operating the RAN in a MIMO mode, multiple antennas of a BTS may communicate with multiple antennas on a WCD. Each antenna at the BTS may have a corresponding antenna on the WCD. The antenna at the BTS and the corresponding antenna on the WCD may be known as an antenna pair. Thus, in a MIMO mode each antenna pair may be thought of as an individual spatial channel on which the BTS and the WCD may communicate. In MISO and SIMO modes, on the other hand, either the BTS or the WCD has multiple antennas and the corresponding device operates with only a single antenna. Thus, there may not be multiple spatial channels in a communication link between a WCD and a BTS when operating in either MISO or SIMO modes.

The foregoing background is illustrative only and is not intended to be in any way limiting. Nothing in the background section is intended as an admission of prior art.

OVERVIEW

Additionally, a receiver in a BTS may operate in one of two receiver algorithm modes, either an interference rejection combining (IRC) mode or a maximal ratio combining (MRC) mode. IRC mode operates to reject channel interference in a multiple-channel system while MRC doesn't. Typically, a receiver is designed to operate in either an IRC mode or an MRC mode. The methods and apparatuses disclosed herein, however, enable a receiver to dynamically switch between operating in an IRC mode and an MRC mode based on parameters of a received signal. An IRC receiver generally performs better than an MRC receiver in an interference environment. However, a typical IRC receiver has a higher processing overhead than a typical MRC receiver. In a situation with low interference, the performance of an IRC receiver is approximately the same as that of an MRC receiver. Thus, the choice between an IRC receiver and an MRC receiver depends on both the desired computation power as well as the radio interference.

The receiver and method of operation disclosed herein may enable a system to (i) achieve the performance of an IRC receiver in an interference environment and (ii) operate with the lower processing overhead of an MRC receiver in an environment with low interference.

A receiver may be configured to connect to a plurality of antennas and each antenna may be configured to receive a respective signal. Further, each respective received signal may be known as a data stream. Additionally, the receiver may be further configured to receive the data stream from each antenna. The receiver may use either an IRC mode or an MRC mode to detect and demodulate the data contained in the data streams.

The receiver may feature a processor configured to determine an interference factor based on the data streams. Further, the interference factor may be a quantification of the amount of interference in the received signals. Various different interference measurement criteria may be used. Once the receiver has determined the interference factor, the receiver may compare the interference factor to a threshold value in order to determine whether the interference factor indicates a high level of interference. If so, the receiver may operate in the IRC mode. However, if the interference factor does not indicate a high level of interference, the receiver may operate in the MRC mode.

One way of calculating the interference factor is by using a correlation matrix (also known as a covariance matrix) for the respective data streams. In practice, for instance, the receiver may calculate a correlation matrix for the respective incoming data streams with the correlation matrix being a measurement of the similarity (or correlation) between the received data streams. For example, in an interference environment, each data stream may contain a portion of the signal that is desired and a portion that is interference. If each antenna receives a similar interference component in the respective received signal, the antennas may appear to be correlated.

Once the receiver has calculated the correlation matrix, it may additionally calculate the eigenvalues of the correlation matrix. The eigenvalues relate to a similarity across all elements of the correlation matrix. In the above example, for instance, if a similar interference was present across all antennas in the system, the similar interference may be indicated by an eigenvalue. In practice, as the similar interference increases, the eigenvalue approaches the number one.

In an example embodiment, a threshold value may be chosen to indicate a limit on the possible interference in a system. The threshold may be based on a difference between the eigenvalue and the number one. In practice, for instance, the threshold may be 0.95. Thus, if the eigenvalue was greater than 0.95, the receiver would recognize exceeding the threshold as an interference environment and responsively the receiver would operate in the IRC mode.

In a second embodiment, the receiver may calculate (or measure) the interference factor based on a received signal strength indicator (RSSI) and a demodulation reference signal (DMRS) for the respective data streams. The RSSI relates to the amount of power including interference in a received signal. The DMRS signal is generally used to determine estimated channel response parameters for each respective data stream, and relates to the amount of power. For example, the DMRS indicates the channel response parameters for each individual data stream. By applying an inverse of the channel response parameters, as indicated by the DMRS, to each data stream, the receiver can compensate for signal distortion introduced in the wireless channel. In such an embodiment, the receiver may determine an interference factor based on the difference between the RSSI and the DMRS.

The receiver may be arranged to compare the difference between the RSSI and the DMRS with a predetermined threshold, to determine whether a high interference level is present in the data streams. If the difference exceeds the threshold, thus indicating a high interference level, the receiver may operate in the IRC mode. Additionally, the threshold may be not be a static value but may change during the operation of the receiver. For example, the threshold may vary based on system parameters and operating conditions during the reception of a data stream.

In a third embodiment, the receiver may measure a block error rate (BLER) and carrier to interference-plus-noise ratio (CINR) associated with the respective data streams. The BLER is a measure of the rate of errors present in a received data stream. The CINR is a measure of the quality of a radio link. The CINR is a ratio of a desired signal (in this example a carrier signal) to the interference and noise present in the data stream. A receiver may determine the interference factor based on a mathematical function that includes the BLER and the CINR.

In one example, for instance, the mathematical function defining the interference factor is $$\text{Interference Factor} = \frac{10^{\left(\frac{CINR}{10}\right)}}{BLER}.$$

A receiver may have a threshold value set based on the specific mathematical function used in a receiver. If the interference factor exceeds the threshold, thus indicating a high interference level, the receiver may operate in the IRC mode. Additionally, the threshold may be not be a static value but may change during the operation of the receiver. For example, the threshold may vary based on system parameters and operating conditions during the reception of a data stream.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DESCRIPTION

I. Example Communication System Architecture

Figure 1:
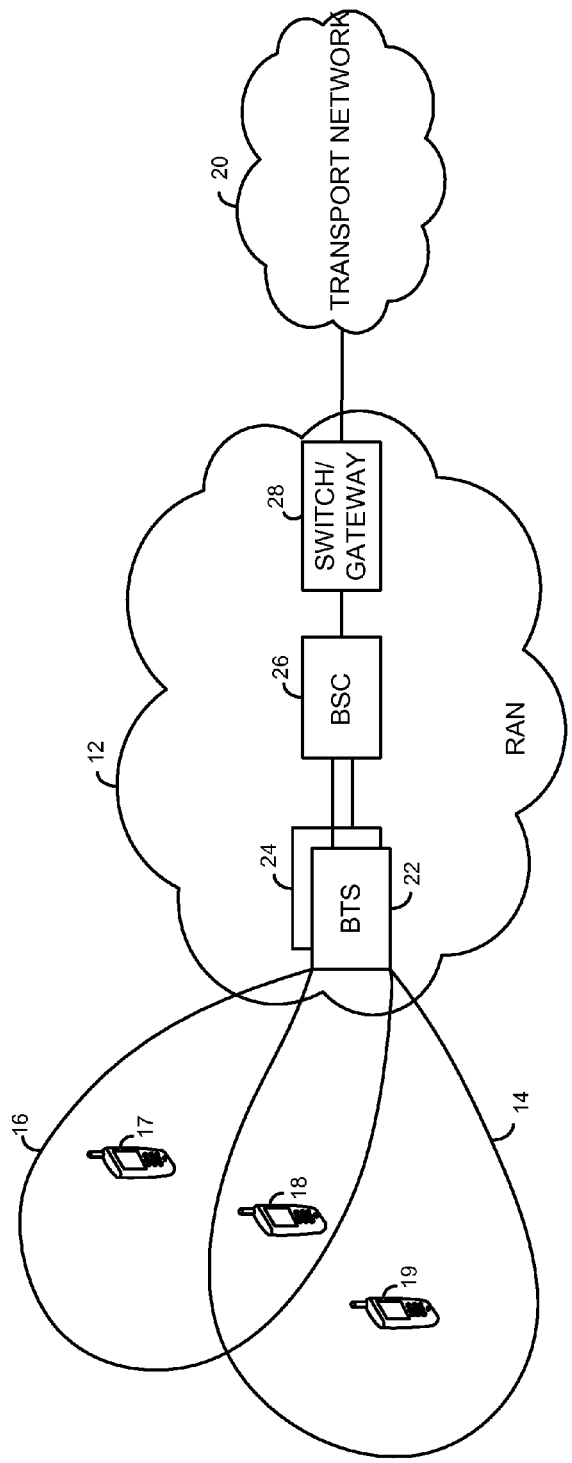
FIG. 1 is a simplified block diagram of a communications network.

Referring to the drawings, FIG. 1 is a simplified block diagram of a communications network in which at least one embodiment of the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, a processor executing program instructions stored in memory or another such non-transitory machine-readable medium may carry out various functions.

As shown in FIG. 1, an exemplary network includes at its core a radio access network (RAN) 12 that radiates to define a plurality of wireless coverage areas, including representative coverage areas 14 and 16. Shown operating in the various coverage areas by way of example are wireless communication devices (WCDs) 17, 18, 19, that communicate over the air with the RAN 12. A WCD, such as WCD 18, may be under the coverage of both coverage areas 14 and 16. In practice, RAN 12 may also be coupled with one or more transport networks, such as representative network 20. With this arrangement, each served WCD can engage in wireless communication with the RAN and may thereby communicate with other entities, such as other WCDs served by the RAN or with entities on transport network 20. Other RANs (not shown) may exist as well.

RAN 12 can generally take any form, the particular details of which are not critical to this disclosure. At a rudimentary level, for instance, the RAN may comprise a simple wireless access point router or switch, which communicates on one side with served WCDs and connects on the other side with the transport network, or merely provides connectivity between WCDs.

At a more complex level (as shown), but still by way of example, the RAN may be a cellular radio access network. As shown, such a network may have a plurality of base transceiver stations (BTSs) (or more generally "base stations"), including representative BTSs 22 and 24, each of which provides antenna elements that radiate to define a respective coverage area and perhaps a set of coverage areas. In that arrangement, each of the coverage areas 14 and 16 may comprise one or more cells and/or cell sectors for instance. In one example, coverage area 14 may correspond to an area defined by a radiation pattern of BTS 22, while coverage area 16 may correspond to an area defined by a radiation pattern of BTS 24. In another example, coverage areas 14 and 16 may each correspond to areas defined by radiation patterns of the same BTS (e.g., BTS 22). The BTSs are in turn shown coupled with a base station controller (BSC) 26, which is then coupled with a switch or gateway 28. The switch or gateway 28 provides connectivity with transport network 20.

In some systems, BSC 26 may manage various aspects of air-interface operation, such as handoffs between BTSs or the like. The BSC may be integrated with a BTS to cooperatively define a "base station," or either component may be considered to provide "base station" functionality. Further, in some systems, a radio network controller (RNC) or other such component can provide similar functionality.

Switch/gateway 28 may manage functions such as handoffs between BSC-governed coverage areas or the like. Further, as noted above, the switch/gateway may provide connectivity with a transport network. For instance, a switch such as a mobile switching center (MSC) or media gateway may provide connectivity with the public switched telephone network (PSTN), and a gateway such as a packet data serving node (PDSN) may provide connectivity with a packet-switched network such as the Internet.

RAN 12 may operate according to an orthogonal frequency-division multiplexing (OFDM) protocol such as IEEE 802.11 (WiFi) systems, IEEE 802.16 (WiMAX) systems, Long Term Evolution (LTE) systems, and/or any other wireless protocol or protocols now known or later developed. In embodiments where the RAN 12 operates as part of an LTE system, the RAN may be an LTE evolved NodeB (eNB) base station.

An air-interface protocol will generally define a "forward link" encompassing communications from the BTS to active WCDs and a "reverse link" encompassing communications from active WCDs to the BTS. Further, each of these links may be structured such that multiple WCDs can simultaneously communicate with the serving BTS, through use of time-division multiplexing, code-division multiplexing (e.g., spread-spectrum modulation), frequency-division multiplexing, and/or some other mechanism. Additionally, each active WCD may communicate with the BTS using multiple forward links and reverse links simultaneously. Each link between the BTS and WCD may operate independently from the other links.

The forward link, for example, may define various sub-channels including (i) a pilot channel on which the RAN may broadcast a pilot signal to allow WCDs to detect wireless coverage, (ii) system-parameter channels (e.g., an overhead channel) on which the RAN may broadcast system operational parameters for reference by WCDs so that the WCDs can then seek network access, (iii) paging channels on which the RAN may broadcast page messages to alert WCDs of incoming communications, and (iv) traffic channels on which the RAN may transmit bearer traffic (e.g., application data) for receipt by WCDs during a communication session. And the reverse link, for example, may define various sub-channels including (i) access channels on which WCDs may transmit "access attempts" such as registration messages and/or call origination requests, and (ii) traffic channels on which WCDs may transmit bearer traffic for receipt by the RAN during a communication session.

II. Example Network Device

Figure 2:
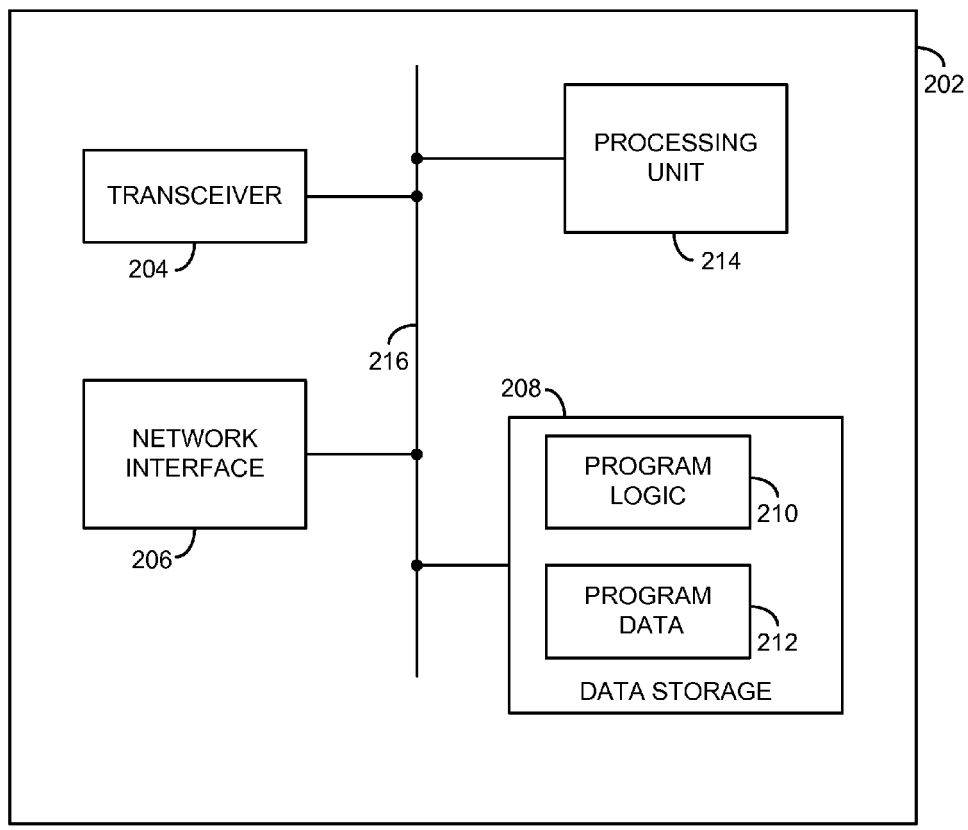
FIG. 2 is a simplified block diagram depicting functional components of an example network device.

Those skilled in the art will appreciate that there can be numerous specific implementations of a network device that may be used in connection with at least one embodiment of the method described herein. By way of example, FIG. 2 is a simplified block diagram depicting functional components of an example network device or system 202 that may be arranged to carry out network-side functions described herein.

The example network device 202 may be representative of BTSs 22/24, BSC 26, switch/gateway 28, BSC 26 integrated with BTSs 22/24, and/or some other entity associated with transport network 20 in FIG. 1, for instance. As shown in FIG. 2, network device 202 includes a transceiver 204, a network interface 206, a processing unit 214, and data storage 208, all of which may be coupled by a system bus 216 or other mechanism. In addition, the network device may also include external storage, such as magnetic or optical disk storage, although this is not shown in FIG. 2.

These components may be arranged to support conventional operation of BTS 22/24, BSC 26, or switch/gateway 28 in a wireless-communication network, such as RAN 12 illustrated in FIG. 1. Certain aspects of network device 202 relevant to the functions discussed herein are discussed briefly below.

Transceiver 204 may include one or more antennas that radiate to define a coverage area (e.g., coverage area 16) in which WCDs may operate. Transceiver 204, in combination with network interface 206, may enable the network device 202 to communicate with WCDs on a network, such as RAN 12. For example, network interface 206, in combination with transceiver 204, may enable network device 202 to transmit forward-link communications to WCDs, and receive reverse-link communication from WCDs. Network interface 206 may take the form of a trunk or optical link that can be coupled with switch/gateway 28, or any Ethernet network interface card or other physical connection that can be coupled with any other entity on the RAN 12 or transport network 24. By way of example, the interface 206 may include a module, such as an LTE chipset, and may support wireless packet-data communications according to LTE modulation schemes.

Processing unit 214 may comprise one or more general-purpose processors (e.g., INTEL microprocessors) and/or one or more special-purpose processors (e.g., dedicated digital signal processor, application-specific integrated circuit, etc.) and may be integrated in whole or in part with the transceiver 204 and/or with other RAN components. In turn, the data storage 208 may comprise one or more volatile and/or non-volatile storage components, such as magnetic or optical memory or disk storage. Data storage 208 can be integrated in whole or in part with processing unit 214, as cache memory or registers for instance. As further shown, data storage 208 is equipped to hold program logic 210 and program data 212. Program logic 210 may comprise machine-language instructions that define routines executable by processing unit 214 to carry out various functions described herein. Additionally, program data 212 may comprise reference data established and/or used during the execution of program logic 210 by processing unit 214.

III. Example Communication Structure

The present methods will be described by way of example with reference to the Long Term Evolution (LTE) family of protocols. However, it should be understood that the methods may also apply with respect to other families of protocols now known or developed in the future.

In an LTE wireless network, the air interface provided by the RAN may be known as evolved UMTS Terrestrial Radio Access Network (e-UTRA or e-UTRAN). The e-UTRA system features a variety of technical features that enable an LTE network to have a relatively high data throughput. For example, an e-UTRA network may use an OFDMA modulation as part of the radio forward link and Single Carrier Frequency-Division Multiple Access (SC-FDMA) on the radio reverse link.

Additionally, an e-UTRA network may feature a multiple-antenna configuration. As described above, example multiple-antenna configurations include MIMO mode, MISO mode, or SIMO mode. Further, in the MIMO, MISO, and SIMO modes, at least one wireless link of the RAN (forward and/or reverse) may involve multiple antennas in communication with at least one wireless communication device (WCD).

By way of example, a data stream received by an antenna of a BTS in a MIMO system may be characterized by the formula, $y_i = h_i x + n_i$. The value $y_i$ indicates a data stream received on the $i^{th}$ antenna of the BTS. The value $h_i$ represents the communication channel (including an antenna parameter) between the WCD and the $i^{th}$ antenna of the BTS. The value x represents the data stream as it was transmitted by the WCD. Finally, the value of $n_i$ represents noise (or interference) on the $i^{th}$ antenna of the BTS. Thus, for each antenna at the BTS, a similar formula can describe the data stream received at each respective antenna.

The group of received signals may be characterized in vector form with the following formula, $Y = HX + N$. The variable Y represents the received signal matrix. The variable H represents the channel matrix. The variable X represents the transmitted signal matrix and the variable N represents the noise matrix. The matrix form of the equation accounts for having multiple data streams.

As also described above, the receiver in the BTS may operate in one of two modes, either an IRC mode or an MRC mode. By way of example, in both an MRC and IRC receiver, the incoming signal may be modeled as Y=HX+N as disclosed above. Therefore, in order to recover the transmitted data stream, X, both types of receivers may apply a combining weight, W, to the received data stream Y. This creates an output $\hat{X}$=WY, where $\hat{X}$ is an approximation of X. However, MRC and IRC receivers are different from one another at least in the manner in which W is calculated.

In an MRC receiver, the combining weight W is equal to the channel matrix H. However, in an IRC receiver, the combining weight W is equal to the channel matrix divided by a correlation matrix (also known as a covariance matrix). Thus, in an IRC receiver the combining weight may be defined by $$W = \frac{H}{R}.$$

In IRC-receiver embodiments, the receiver may calculate a correlation matrix for the respective incoming data streams. The correlation matrix indicates a measurement of the similarity (or correlations) between the received data streams. For example, in an interference environment, each data stream may contain a high level of interference (or noise); in such an example, the correlation matrix would indicate a high level of similarity in the manner in which the signal is correlated across multiple data streams.

A typical IRC receiver has a higher processing overhead than a typical MRC receiver. However, an IRC receiver generally performs better in an interference environment than an MRC receiver. The increase in performance in an interference environment produced by an IRC receiver is due to the IRC combining weight having a component that depends on the correlation matrix. Thus, interference can be divided out of a data stream.

In a situation with low interference, the performance of an IRC receiver is approximately the same as that of an MRC receiver. The performance is approximately the same because in an environment with low interference, the correlation matrix, R, will approach one. Therefore, in a low-interference situation, the weighting factor W for an MRC receiver will approach the weighting factor W for an IRC receiver. Thus, in traditional receiver design, the choice between an IRC receiver and an MRC receiver often depends on both the desired computation power and the expected typically prevailing radio interference.

As stated above, it is typically the case that a given receiver is designed to operate either exclusively in an IRC mode or exclusively in an MRC mode. The methods and apparatuses disclosed herein, however, enable a receiver to dynamically switch between operating in an IRC mode and an MRC mode based on parameters of a received signal, perhaps among one or more other factors. The receiver and method of operation disclosed herein may enable a system to (i) achieve the performance of an IRC receiver in a high-interference environment (and thus a higher cumulative level of performance as an overall matter (as compared at least with an MRC-only implementation)) and (ii) operate with a lower processing overhead in an environment with low interference (and thus a lower cumulative processing overhead as an overall matter (as compared at least with an IRC-only implementation)).

IV. Dynamically Changing a Receiver Mode Based on Radio Conditions

Figure 3:
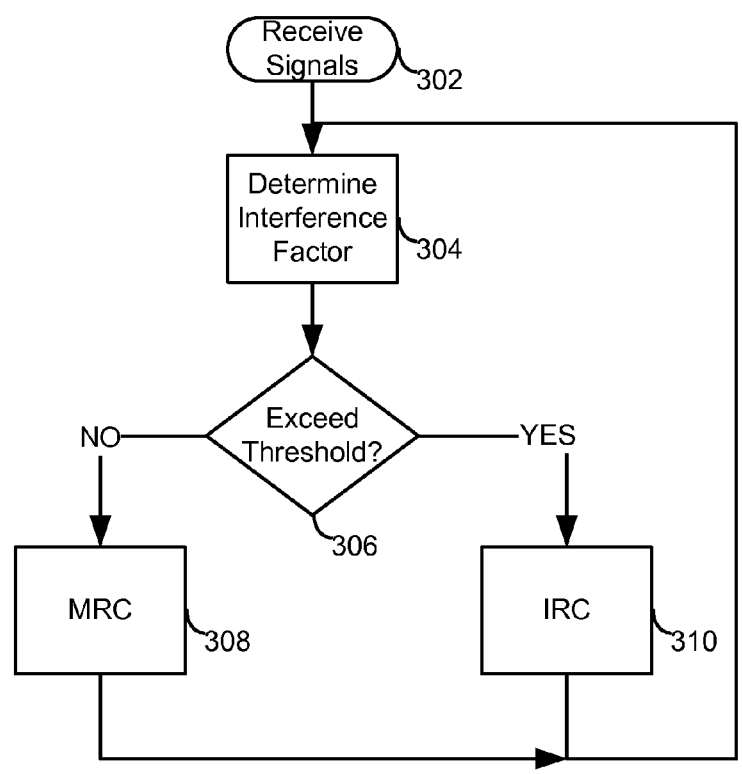
FIG. 3 is a simplified block diagram of a method for switching between an IRC and MRC receiver.

FIG. 3 is a simplified block diagram of a method by which at least one embodiment of the present system can implement dynamic switching between an IRC and MRC receiver. In an example embodiment, the method begins at 302 when signals, also known as a data streams, are received by a receiver. Each antenna may be configured to receive a respective signal. Each respective received signal may be known as a data stream. A receiver within the BTS receives the data stream from each antenna. The receiver is capable of using either an IRC mode or an MRC mode to decode the data contained in the data streams.

Once the signals have been received by the receiver, at 304 a processor in the BTS may determine an interference factor based on the data streams. In one embodiment, the interference factor may be a quantification of the amount of interference and/or noise in the received signals. In one arrangement, the interference may be a signal intended for either a different WCD or different antenna that is received by a specific antenna of the BTS. In another arrangement, interference may be radio signals that do not originate from either the WCD or the BTS, but that form a portion of the received data stream. As such, the terms noise and interference may reference difference sources of radio signals. However, for some embodiments disclosed herein, the terms noise and interference may be used interchangeably as both words indicate an undesired signal. Additionally, various different interference-factor measurement criteria may be used depending on each specific embodiment.

One way of calculating the interference factor is based on a correlation matrix (also known as a covariance matrix) for the respective data streams. The receiver may calculate the correlation matrix for the respective incoming data streams. In one example, the correlation matrix is a measurement of the similarity (or correlations) between the received data streams.

For example, in an interference environment, each data stream may contain both interference as well as the desired signal. To quantify the interference, the correlation matrix may indicate a similarity of signals received by different antenna elements. If all antenna elements are receiving the same interference, then there will be a correlation between the signals received by various antennas. However, if the various signals received by the various antennas appear to be independent of one another—at least with respect to level and/or type of received interference, then these signals are uncorrelated.

Once the correlation matrix has been calculated, the processor in the receiver may calculate the eigenvalues of the correlation matrix. The eigenvalues of the correlation matrix relate to a similarity across all elements of the correlation matrix. If a similar interference was present across all antennas in the system, an eigenvalue indicates the similar interference. In at least one embodiment, this eigenvalue will be the interference factor, as the eigenvalue indicates the level of interference (or noise) of each data stream. As the similarity of the interference increases, the magnitude of the eigenvalue will approach the number one.

In a second embodiment, the processor in the receiver may calculate (or measure) an interference factor based on an RSSI and a DMRS for the respective data streams. Generally, the RSSI relates to the amount of power including interference in a received signal, and in particular is typically a measure of the total power including interference received within a given bandwidth. For example, the RSSI of a radio signal may measure −80 decibels (dBm) in a given cellular radio channel.

Generally, the DMRS signal is generally used to determine estimated channel parameters for each respective data stream. The receiver uses the DMRS signal to determine estimated channel parameters for each respective data stream. For example, the DMRS indicates the channel parameters for each individual data stream. By applying an inverse of the channel parameters, as indicated by the DMRS, to each data stream, the receiver can compensate for signal distortion introduced in the wireless channel.

The receiver receives the DMRS and measures the power level of the DMRS. For example, the power level of the DMRS may measure −100 decibels (dBm). In at least one embodiment, the receiver may determine an interference factor based on the difference between the RSSI and the DMRS. In the example above, the difference between the RSSI and the DMRS is 20 dB. The calculation of the difference between the RSSI and DMRS is a measurement of the amount of power delivered in channel versus the amount of power delivered by a specific signal. In an environment with high interference, the difference between the two will tend to be greater (i.e. more power is delivered outside the reference signal) as compared with an environment that does not have high interference.

In a third embodiment, the receiver may measure a BLER and CINR associated with the respective data streams. As described above, BLER is a measure of the rate of errors present in blocks in a received data stream. For example, the receiver may check each received block in a data stream to see if the block has an error. In one example, the receiver may indicate that 0.25% of received blocks have an error.

As also described above, CINR is a measure of the quality of a radio link, and generally is defined as a ratio of a desired signal (in this example a carrier signal) to the interference and noise present in the data stream. In one example, the carrier signal may measure −80 decibels (dBm) and the interference and noise may measure −110 decibels (dBm). Thus, for the example provided, the ratio between the carrier signal and the interference and noise is 30 decibels.

In the present embodiment, an interference factor may be determined based on a mathematical function including the BLER and the CINR. One possible example mathematical function defining the interference factor is $$\text{Interference Factor} = \frac{10^{\left(\frac{CINR}{10}\right)}}{BLER}.$$

Generally, a mathematical function may aid in determining the source of the errors measured by the BLER calculation. For example, in some situations, the BLER may be high, but the cause may be something other than noise in the system. In some cases, the cause may be a low received power level. In other cases, the BLER may be high due to high interference (indicated by a poor CINR). Thus, the mathematical function may indicate when both the BLER is high and when the CINR is poor, indicating high interference.

Once the processor in the BTS has determined an interference factor, the system may compare the interference factor to a threshold, as shown at 306. In some embodiments, the interference factor is continuously updated while signals are being received. In other embodiments, the interference factor is calculated only at the start of signal reception. Additionally, the comparison at 306 may be made at each iteration of the interference-factor calculation, or perhaps when communication on a radio link starts.

The system may have a threshold to which the calculated interference factor is compared. Typically, the threshold may vary depending on the method used to calculate the interference factor. In some embodiments, the threshold is predetermined. In other embodiments, the threshold may vary during system operation. For example, the threshold may change based on radio conditions, a number of users connected to a particular BTS, and/or based on one or more other metrics.

In the first example interference-factor calculation described above, where the interference factor is calculated based on a correlation matrix, the threshold may be a difference between the eigenvalue and the number one. As the noise and interference components of a received signal increase, the eigenvalue of the correlation matrix may approach the number 1. Additionally, in some embodiments, the eigenvalue of the correlation matrix may approach the number −1 in high interference operating environments. Thus, the comparison may be made between the absolute value of the eigenvalue and the number one. In one example, a possible threshold may be 0.95. Other values for the threshold may be used as well.

In the second example interference-factor calculation described above, the receiver may have stored a predetermined threshold difference between the RSSI and the DMRS. In this embodiment, the threshold difference may take many forms. For example, the threshold difference may be a decibel difference between the RSSI and the DMRS. In other embodiments, the threshold difference may be a difference in received power. For example, the threshold may also be a measure of Watts (or microWatts, nanoWatts, picoWatts, etc.) between the RSSI and the DMRS. Those of skill in the art readily understand how to convert a measurement from decibels (dBm) to Watts, and to make other similar standard conversions.

In the third example interference-factor calculation described above, the interference factor may be determined based on a mathematical function including the BLER and the CINR. In this embodiment, the threshold may be a value based on the specific mathematical formula chosen. For example, one possible mathematical function may define the interference factor as $$\text{Interference Factor} = \frac{10^{\left(\frac{CINR}{10}\right)}}{BLER}.$$

In this embodiment, the threshold may be a number such as 100. The number and formula presented are just one example of a possible formula and threshold that may be used in accordance with the presently described systems and methods. Other thresholds and mathematical formulas may be used as well.

In any of the disclosed embodiments, if the threshold is exceeded, thus indicating a high interference level, the receiver may operate in the IRC mode, as shown at 310. However, if the interference factor does not indicate a high level of interference, the receiver may operate the receiver in the MRC mode, as shown at 308. If the threshold is exactly met, in one situation the receiver may operate in the IRC mode. However, in another situation, the receiver may operate in the MRC mode if the threshold is exactly met.

In some embodiments, once a receiver mode is chosen, the system will continue to use the chosen receiver mode until a new data connection is established. When a new data connection is established, the system may return to 304 and re-determine an interference factor. However, in other embodiments, determination (304) of an interference factor and comparing (306) to a threshold may be performed continuously (or periodically) during a radio connection. Thus, the receiver may be able to dynamically change based on radio conditions during a connection.

Figure 4:
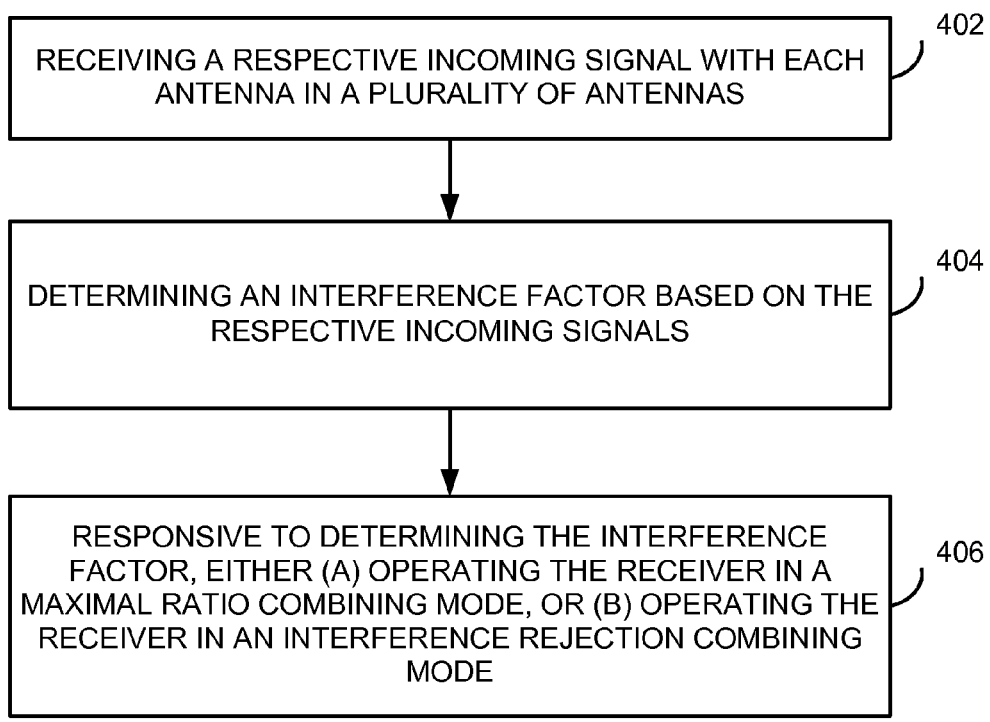
FIG. 4 is a simplified flow diagram of a method for switching between an IRC and MRC receiver.

FIG. 4 is a simplified flow diagram of a method by which at least one embodiment of the present system can implement switching between an IRC and MRC receiver. The depicted method begins at 402 when signals are received by each antenna in a plurality of antennas. In some MIMO systems, it is desirable that the received signals be uncorrelated. A correlation between a subset of the received signals may indicate either noise and/or interference on the radio link. Noise and interference may cause the radio link to perform more poorly.

Once the signals have been received, an interference factor is determined at 404. The interference-factor calculation may relate to the amount of interference contained in the received signals. Various different measurements for the interference factor may be used. Some example interference-factor measurements are disclosed herein, though any suitable interference-factor measurement and/or calculation approach could be used in a given implementation.

After an interference factor has been calculated, the receiver determines (at 406) whether there is a high level of interference in the received signals. If the receiver determines that there is a high interference level, the system may operate with the receiver in an IRC mode. However, if the receiver determines there is not a high interference level, the system may operate with the receiver in an MRC mode. The disclosed receiver may dynamically switch modes, and thus, among other advantages and benefits of the presently disclosed systems and methods, may achieve the performance of an IRC receiver in an interference environment and the low processing overhead associated with an MRC receiver in a relatively less interference environment.

IV. Conclusion

Example embodiments have been described above. Those skilled in the art will understand, however, that changes and modifications may be made to these embodiments without departing from the true scope of the invention, which is defined by the claims.

What is claimed is:

1. A method comprising:
   receiving a respective incoming signal with each antenna in a plurality of antennas;
   determining an interference factor based on the respective incoming signals with a processor located within a receiver, wherein determining the interference factor comprises:
   (i) measuring a block error rate (BLER) associated with the respective incoming signals;
   (ii) measuring a carrier to interference-plus-noise ratio (CINR) associated with the respective incoming signals; and
   (iii) determining the interference factor based on a mathematical function that includes the BLER and the CINR; and
   operating the receiver in an interference rejection combining mode when the interference factor indicates a high level of interference, and instead in a maximal ratio combining mode when the interference factor does not indicate a high level of interference.

2. The method of claim 1, wherein determining the interference factor comprises:
   calculating a correlation matrix for the respective incoming signals;
   calculating eigenvalues of the correlation matrix; and
   determining the interference factor based on the eigenvalues.

3. The method of claim 2, wherein the interference factor is equal to the eigenvalues.

4. The method of claim 3, wherein a high level of interference is indicated by a threshold equivalent to a predetermined range around the number 1.

5. The method of claim 1, wherein determining the interference factor comprises:
   (i) measuring a received signal strength indicator (RSSI) associated with the respective incoming signals;
   (ii) measuring a demodulation reference signal (DMRS) associated with the respective incoming signals; and
   (iii) determining the interference factor based on the difference between the RSSI and the DMRS.

6. The method of claim 1, wherein the mathematical function is $$\text{Interference Factor} = \frac{10^{\left(\frac{CINR}{10}\right)}}{BLER}.$$

7. An apparatus comprising:
   a plurality of antennas, each antenna configured to receive a respective signal;
   a receiver configured to:
   (i) receive the respective signals received by each antenna; and
   (ii) operate in either a maximal ratio combining mode or an interference rejection combining mode; and
   a processor configured to:
   (i) determine an interference factor based on the respective incoming signals, wherein the interference factor comprises:
      (a) measuring a block error rate (BLER) associated with the respective incoming signals;
      (b) measuring a carrier to interference-plus-noise ratio (CINR) associated with the respective incoming signals; and
      (c) determining the interference factor based on a mathematical function that includes the BLER and the CINR; and
   (ii) operate the receiver in the interference rejection combining mode when the interference factor indicates a high level of interference; and
   (iii) operate the receiver in the maximal ratio combining mode when the interference factor does not indicate a high level of interference.

8. The apparatus of claim 7, wherein determining the interference factor comprises:
   calculating a correlation matrix for the respective incoming signals;
   calculating eigenvalues of the correlation matrix; and
   determining an interference factor based on the eigenvalues.

9. The apparatus of claim 8, wherein the interference factor is equal to the eigenvalues.

10. The method apparatus of claim 9, wherein the threshold is equal to a predetermined range around the number 1.

11. The apparatus of claim 7, wherein determining the interference factor comprises:
  (i) measuring a received signal strength indicator (RSSI) associated with the respective incoming signals;
  (ii) measuring a demodulation reference signal (DMRS) associated with the respective incoming signals; and
  (iii) determining the interference factor based on the difference between the RSSI and the DMRS.

12. The apparatus of claim 7, wherein the mathematical function $$\text{Interference Factor} = \frac{10^{\left(\frac{CINR}{10}\right)}}{BLER}.$$

13. An article of manufacture including a non-transitory computer-readable medium having stored thereon program instructions that, when executed by a radio access network (RAN), cause the RAN to perform operations comprising:
  receiving a respective incoming signal with each antenna in a plurality of antennas;
  determining an interference factor based on the respective incoming signals with a processor located within a receiver, wherein determining the interference factor comprises:
  (i) measuring a block error rate (BLER) associated with the respective incoming signals;
  (ii) measuring a carrier to interference-plus-noise ratio (CINR) associated with the respective incoming signals; and
  (iii) determining the interference factor based on a mathematical function that includes the BLER and the CINR; and
  operating the receiver in an interference rejection combining mode when the interference factor indicates a high level of interference and instead in a maximal ratio combining mode when the interference factor does not indicate a high level of interference.

14. The article of manufacture of claim 13, wherein determining the interference factor comprises:
  calculating a correlation matrix for the respective incoming signals;
  calculating eigenvalues of the correlation matrix; and
  determining the interference factor based on the eigenvalues.

15. The article of manufacture of claim 14, wherein the interference factor is equal to the eigenvalues.

16. The article of manufacture of claim 15, wherein the threshold is equal to a predetermined range around the number 1.

17. The article of manufacture of claim 13, wherein determining the interference factor comprises:
  (i) measuring a received signal strength indicator (RSSI) associated with the respective incoming signals;
  (ii) measuring a demodulation reference signal (DMRS) associated with the respective incoming signals; and
  (iii) determining the interference factor based on the difference between the RSSI and the DMRS.

18. The article of manufacture of claim 13, wherein the mathematical function is $$\text{Interference Factor} = \frac{10^{\left(\frac{CINR}{10}\right)}}{BLER}.$$

\* \* \* \* \*